INVENTOR:
ARLING DIX BROWN JR
BY William D. Hall.
ATTORNEY

Inventor:
Arling Dix Brown Jr.
by William D Hall.
Attorney

Patented Sept. 12, 1950

2,521,824

UNITED STATES PATENT OFFICE 2,521,824

ELECTRONIC SWITCH

Arling Dix Brown, Jr., Cambridge, Mass., assignor to the United States of America as represented by the Executive Secretary of the Office of Scientific Research and Development Application May 8, 1946, Serial No. 668,050

3 Claims. (Cl. 178—44)

This invention relates to a method and circuit arrangement for improved switching and more particularly electronic audio switching.

The requirements of switching in audio circuits are generally different from those in other signal circuits. In most signal circuits it is desired to switch signal on or off as rapidly as possible without the introduction of transients by the switching process. This can be done by either a mechanical switch or a switch involving vacuum tubes, depending on the power and type of signal involved.

When switching an audio signal, not only should no transients be introduced by the switching but the actual change in level should take a controllable length of time with no distortion of the signal occurring, not only at the initial and final states but during the change from one condition to the other. The need for switching to be without transients is obvious, in that any transients would produce audible clicks in the final signal. The other requirement arises from the reaction of the ear which, although no actual electrical clicks or transients are present in the signal, will introduce an apparent click if the signal is changed in level too rapidly. This can be explained by the fact that the sudden change in level spreads energy into other frequencies than those existing in the signal; this added energy appears to the ear as a click.

There are at least three possible methods of satisfying the basic requirements for audio switching. The first method is the manual or mechanical control of an attenuator. This is by far the simplest method but can be used only when a relatively long time interval for a change in level can be tolerated.

The second method will work only when sine wave signals of a single frequency are present. Any electronic or mechanical method of rapid switching is used and the controlled or output signal is then fed through a narrow band pass filter centered on the same frequency as the signal. The output of this filter, if the filter is sufficiently sharp, will be free from both electrical and apparent clicks.

The third method is the use of vacuum tubes to effect the switching. In general the signal is fed into one grid of a tube and the output taken from the plate. The effective gain of the tube is then varied by controlling the voltage on the same or another grid. In switching other than audio circuits by this method, the switching is rapid and to avoid a transient as the tube goes from cutoff to normal operating condition and back, another tube is added whose plate is tied to the plate of the first tube. The second tube is then controlled in the opposite fashion from the signal tube, i. e. when the one tube is conducting the other is cut off. Since the switching time is short, it is only necessary that the two tubes take the same current in their conducting condition to insure that no transient is produced.

In audio circuits it is customary to use a push pull circuit and again control the gain by a bias voltage for the two tubes. Although this method theoretically prevents any click, as any change in current produced by a change in the bias voltage is balanced out, the difficulty of matching the tube properly and the lack of tubes suitable for transformer coupling and bias gain control, makes the circuit impractical for general use.

An object of the invention therefore is to overcome the difficulty referred to and to devise an improved method and circuit arrangement for audio switching. Other objects and novel features will appear from the following discussion.

Figures 3*a*, 3*b*, 3*c* and 3*d* are additional graphs illustrating tube operation in accordance with the invention.

The invention includes a vacuum tube called the signal tube, coupled as an amplifier, whose signal gain can be controlled by a voltage which is referred to as the gain control voltage; a second vacuum tube called the balance control tube, coupled to the gain control voltage so that an output voltage is obtained which is a function of the gain control voltage; a third vacuum tube known as the balance tube whose output is tied to the output of the signal tube and coupled so that the output current is a function of output voltage of the balance control tube.

The switching circuit is adjusted so that any change in current in the output signal tube, caused by a change in the gain control voltage, is balanced out by an equal and opposite current change in the balance tube. The result is an amplifier whose gain can be controlled by a voltage change which cannot itself produce any change in the output voltage.

Considering the method of the invention in greater detail, it should be observed that it is similar to the rapid switching methods suggested for other than audio signal circuits but uses more elaborate circuits to insure a balance during the entire switching period.

Figure 3A:
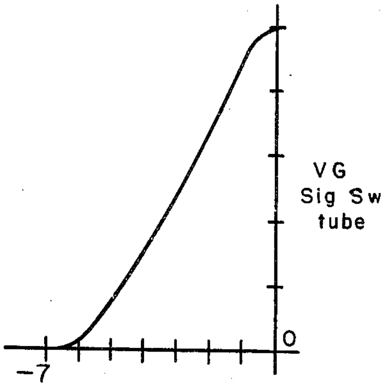

The first or signal tube is coupled as an amplifier whose gain can be varied by a control voltage. This control should preferably be a grid other than the signal grid and one which draws no current in order that the gain control voltage supply does not have to supply any power. Also distortion should be at a minimum at full gain, increasing as little as possible as the tube is turned from on to off. The type 6L7 tube satisfies these requirements rather well with the No. 3 grid used for the gain control voltage and the No. 1 grid as a signal grid. The operation of the gain control voltage is shown in Fig. 3*a*. Changing the gain control voltage will cause a change in current in the tube independent of the effects of the signal voltage. The additional two tubes are used to prevent this change of current in the signal tube from appearing as an output voltage.

Figure 1:
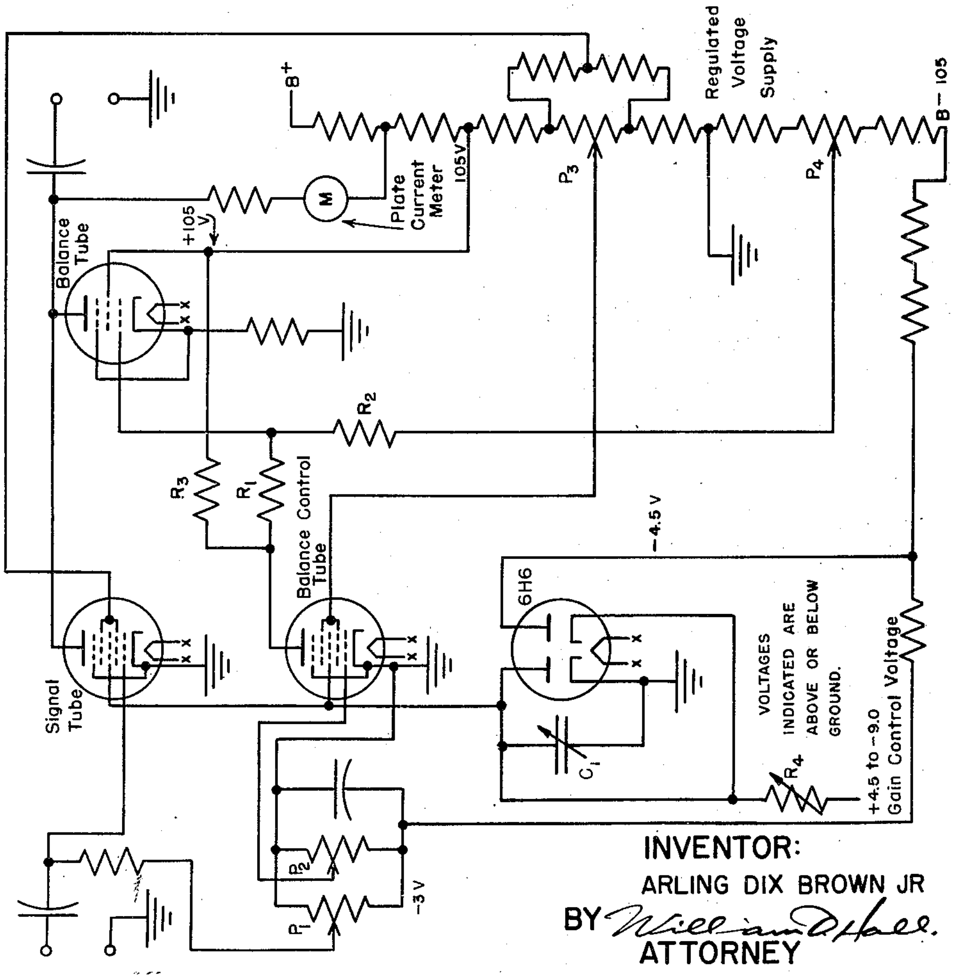
Figure 1 is a schematic diagram of circuit means for carrying out the method of the invention.
Figure 3D:
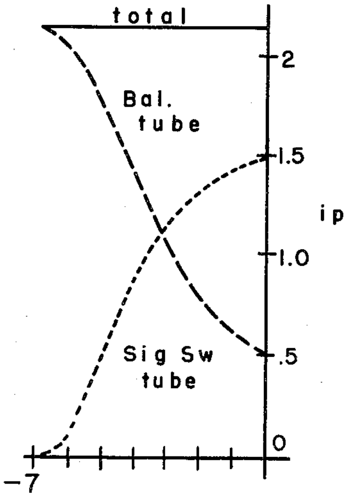
Figure 3B:
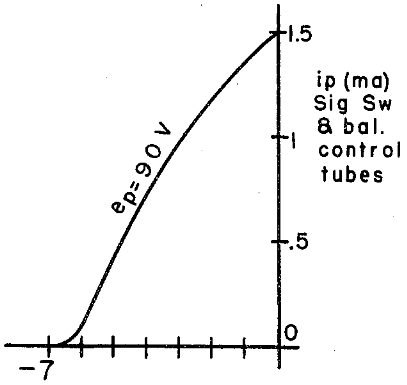

The second (balance control) tube is also a 6L7 whose No. 3 grid is coupled to the gain control voltage as seen in Fig. 1. Its plate is connected through a low resistance $R_3$ to a regulated voltage supply of about the same voltage as the operating plate voltage of the signal tube. Since the 6L7 acts as a pentode, i. e. the plate current is relatively independent of plate voltage, the changes in plate currents in the two tubes caused by changes in the gain control voltage, are about equal. The plate current characteristic is shown in Fig. 3*b*.

Figure 3C:
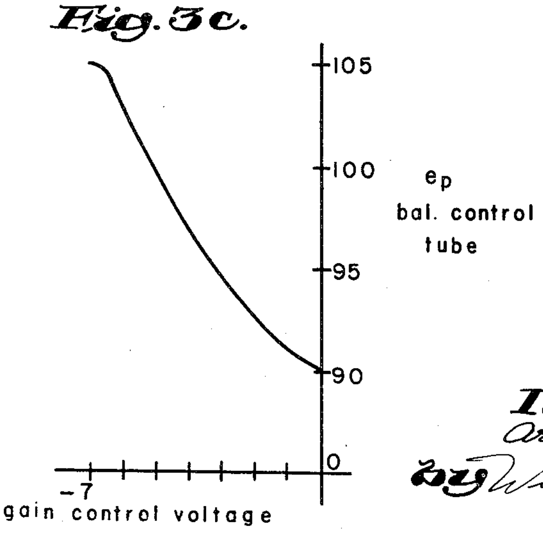

This change in plate current in the balance control tube causes a plate voltage change which is directly proportional to it, as given in Fig. 3*c*.

The balance tube, the third tube in the circuit, has its plate tied to the plate of the signal tube. It acts as a linear amplifier, i. e. it produces a current change proportional to the voltage input. Since its plate resistance is a shunt on the 6L7 load, it is desirable to use a pentode, such as the 6SJ7, which has a high plate resistance. The plate voltage changes in the balance control tube are applied through the voltage divider $R_1R_2$, which is used to balance out the steady direct current plate voltage of the balance control tube, to the grid of the balance tube. This provides a current change which is opposite and equal to the current change in the signal tube produced by the gain control voltage. The result, as shown in Fig. 3*d*, is that the steady current in the plate load remains constant regardless of the gain control voltage. Thus the gain of the signal tube can be varied from zero to maximum without the introduction of any transients in the output.

It is not necessary to use selected tubes in the circuit, because of the opportunity of using calibration potentiometers to compensate for slightly different tube characteristics. Referring to Fig. 1, there are four calibration potentiometers.

$P_1$ for adjusting the bias on the No. 1 grid of the 6L7 signal tube; $P_2$ for adjusting the bias on the No. 1 grid of the 6L7 balance control tube; $P_3$ for adjusting the screen voltage (grids No. 2 and No. 4) of the type 6L7 balance control tube; and $P_4$ for adjusting the bias on the type 6SJ7 balance tube.

Figure 2:
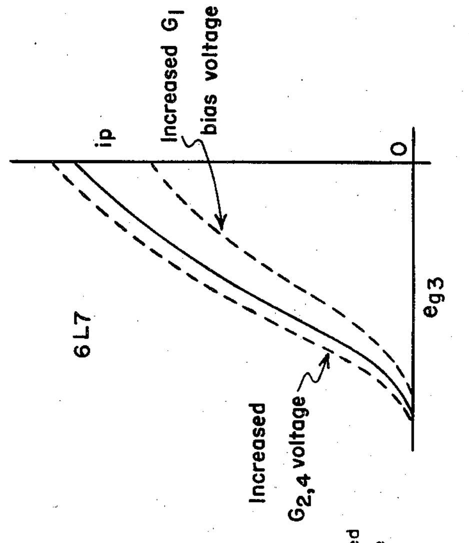
Figure 2 is a graph.

It is evident, referring to Fig. 2, that these adjustments effectively vary the cutoff voltage and the maximum plate current in the balance control tube, while maintaining the same characteristic shape of the curve for the tube when the plate current is plotted against the gain control voltage. Thus this tube is matched to the signal tube by the adjustment of these two voltages.

The calibration procedure is as follows:

The bias on the 6SJ7 balance tube is increased so that the tube is essentially cut off. With the gain control voltage at 0, the No. 1 grid bias on the 6L7 signal tube is adjusted by means of $P_1$ for 1.5 milliamperes plate current (of signal and balance tubes). With the gain control voltage at $-7$ or greater, i. e. signal and balance control tubes cut off, the bias voltage on the 6SJ7 balance tube is adjusted by means of $P_4$ to give 2.15 milliamperes plate current. As the gain control voltage is carried from $-7$ to 0, the No. 1 grid bias and screen voltage (grids No. 2 and No. 4) of the balance control tube are adjusted by means of $P_2$ and $P_3$ respectively to give minimum variation in the combined signal tube and balance control tube plate current from the 2.15 milliamperes value.

In addition to the switching circuit another electronic circuit is used in which a condenser $C_1$ shunted by two diodes is used to give an approximately linear rate of opening and closing of the switch. The diode current characteristic offsetting the non linearity of the charging and discharging of the condenser.

The duration of the opening and closing of the switch may be controlled by adjusting the values of $C_1$ and $R_4$ in Fig. 1.

It will be observed therefore that I have provided a positive and efficient means of clickless audio switching. While I have shown a preferred embodiment of the invention it is intended that various modifications may be resorted to in keeping with the spirit of the invention as defined by the appended claims.

I claim:

1. Electronic switching means for audio circuits comprising a first vacuum tube adapted to function as a signal tube member and being coupled as an amplifier; gain control voltage means for controlling the signal gain of the said signal tube; a second tube functioning as a balance control tube, said second tube being coupled to the gain control voltage to provide an output voltage which is a function of the gain control voltage; a third vacuum tube having its output tied to the output of the signal tube and coupled so that the output current is a function of the output voltage of the balance control tube; a variable resistor in series with the gain control voltage; a fourth tube functioning as a diode rectifier; a variable condenser connected in shunt with said fourth tube; whereby said variable resistor, condenser, and said rectifier constitute a linearity control for said switching means.

2. Electronic switching means for audio circuits comprising a first vacuum tube adapted to function as a signal tube member and being coupled as an amplifier; gain control voltage means for controlling the signal gain of the said signal tube; a second tube functioning as a balance control tube, said second tube being coupled to the gain control voltage to provide an output voltage which is a function of the gain control voltage; a third vacuum tube having its output tied to the output of the signal tube and coupled so that the output current is a function of the output voltage of the balance control tube; a resistor in series with the gain control voltage; a fourth tube functioning as a diode rectifier, a condenser connected in shunt with said fourth tube, whereby said fourth tube, said condenser and said resistor provide a linearity network for said switching means.

3. Electronic switching means for audio circuits comprising a vacuum tube adapted to function as a signal tube member and being coupled as an amplifier; gain control voltage means for controlling the signal gain of the said signal tube; a second tube functioning as a balance control tube, said second tube being coupled to the gain control voltage to provide an output voltage which is a function of the gain control voltage; a third vacuum tube having its output tied to the output of the signal tube and coupled so that the output current is a function of the output voltage of the balance control tube; a resistor connected in series with said gain control; a fourth tube functioning as a rectifier having its anodes coupled to the input circuits of the first and second tubes; a condenser connected in shunt with said rectifier, voltage, whereby said rectifier, condenser and resistor comprise a linearity circuit for said switching means.

ARLING DIX BROWN, Jr.

REFERENCES CITED

The following references are of record in the file of this patent:

UNITED STATES PATENTS

| Number | Name | Date |
|---|---|---|
| 2,092,496 | Branson | Sept. 7, 1937 |
| 2,217,957 | Lewis | Oct. 15, 1940 |
| 2,360,466 | Bedford et al. | Oct. 17, 1944 |